July 22, 1958 E. C. HARDESTY 2,844,057
INSULATION STRIPPING APPARATUS
Filed Sept. 8, 1955 3 Sheets-Sheet 1

INVENTOR.
E. C. HARDESTY
BY
ATTORNEY

July 22, 1958  E. C. HARDESTY  2,844,057
INSULATION STRIPPING APPARATUS
Filed Sept. 8, 1955  3 Sheets-Sheet 2

INVENTOR.
E. C. HARDESTY
BY
ATTORNEY

July 22, 1958   E. C. HARDESTY   2,844,057
INSULATION STRIPPING APPARATUS
Filed Sept. 8, 1955   3 Sheets-Sheet 3
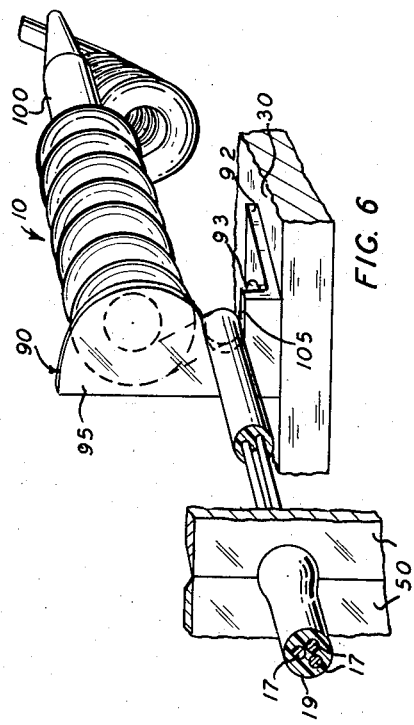
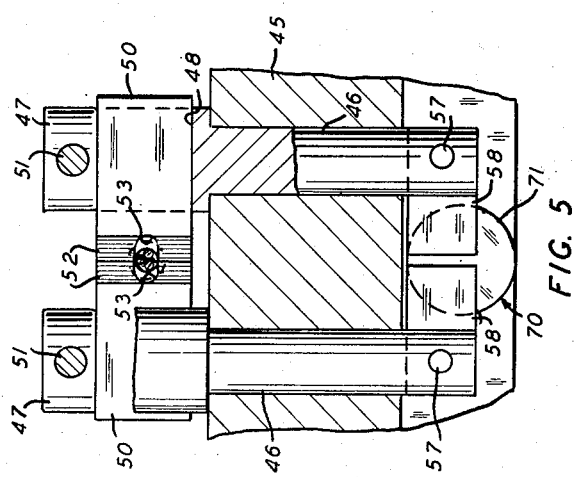
INVENTOR.
E. C. HARDESTY
BY
ATTORNEY ations.

United States Patent Office 2,844,057
Patented July 22, 1958

2,844,057

INSULATION STRIPPING APPARATUS

Edwin C. Hardesty, Baltimore, Md., assignor to Western Electric Company, Incorporated, New York, N. Y., a corporation of New York Application September 8, 1955, Serial No. 533,205

4 Claims. (Cl. 81—9.51)

This invention relates to insulation stripping apparatus and more particularly to apparatus for stripping insulation from insulated wires having spirally coiled portions.

In the manufacture of certain types of retractile cords, it is a well-known practice to fabricate cordage by providing a plurality of individually insulated conductors with a sheath composed of a cured elastomer compound. A length of this cordage is then coiled into a cord having a helically coiled intermediate portion and straightened, uncoiled end portions, the latter extending longitudinally. The elastomer is then heated to set the intermediate portion of the cord in its helical form. Subsequently, the sheath is stripped from the straightened, uncoiled ends of the cord to expose the end portions of the individually insulated conductors. The extremities of the exposed end portions of the conductors are then provided with metallic connector tips which are utilized to connect the conductors to communication equipment.

Heretofore, considerable difficulty has been encountered in stripping the sheath from the straightened, uncoiled end portions of such retractile cords. The sheath is stripped from an end portion of the cord by forcing a pair of cooperating stripper blades into cutting engagement with the sheath, and then pulling the cord longitudinally to withdraw it from between the stripper blades. The stripper blades hold the sheath against withdrawal and effectively strip the sheath from the end portion of the cord.

Difficulty arises in obtaining the required grip on the cord for pulling it longitudinally, without causing damage to the helically coiled portion thereof. Previously it has been a practice to partly uncoil a few convolutions of the helically coiled portion of the cord and to insert this temporarily uncoiled portion between gripping jaws provided on conventional wire strippers similar to the type disclosed in Beck Patent 2,563,911. However, when the cord is tensioned as it is withdrawn between the stripper blades, an appreciable amount of the set previously imparted to the temporarily uncoiled convolutions of the intermediate portion is lost permanently. As a result, the finished cord loses some of its retractability.

An object of this invention is to provide new and improved insulation stripping apparatus.

It is another object of this invention to provide new and improved apparatus for stripping insulation from insulated wires having spirally coiled portions.

Apparatus illustrating certain features of the invention may include stripping means for engaging the insulation on an insulated wire having a spirally coiled portion, a support, a projecting, elongated, coil-receiving member having one end thereof mounted fixedly to the support and designed to receive one or more of the convolutions of the spirally coiled portion of the wire. Means are provided for moving the support and the stripping means relatively apart, whereby the convolutions of the wire positioned on the coil-receiving member tighten about and grip the member and the wire is withdrawn from the stripping means to strip the insulation therefrom.

More specifically, such apparatus may include a support, a slide mounted on the support for longitudinal sliding movement therealong, and a pair of pivoted cooperating stripper blades mounted on the support at either side of the longitudinal axis of the slide. Resilient means normally urge the stripper blades into cutting engagement with the sheath on the end portion of a retractile cord positioned therebetween, and means operated by the slide hold the stripper blades separated whenever the slide is in an inoperative position most contiguous to the stripper blades for the reception of the end portion to be stripped therebetween.

A vertical support member is mounted on the slide for movement therewith. Attached fixedly to the support member is a horizontally extending, elongated horn designed to receive one or more of the convolutions of the helically coiled central portion adjacent to the end portion to be stripped. Means are provided for moving the slide longitudinally away from the stripper blades whereby the stripper blades are urged into cutting engagement with the sheath on the end portion positioned therebetween, and the convolutions positioned on the horn tighten about and grip the horn so that the end portion is withdrawn between the stripper blades to strip the sheath therefrom.

A complete understanding of the invention may be had from the following detailed description of apparatus forming a specific embodiment thereof, when read in conjunction with the appended drawings, in which:

Fig. 5 is an enlarged, fragmentary, vertical section taken along line 5—5 of Fig. 4 with parts thereof broken away, and Fig. 6 is an enlarged, fragmentary view in perspective of portions of the apparatus shown in Fig. 4 illustrating the parts in an operative position.

Figure 1:
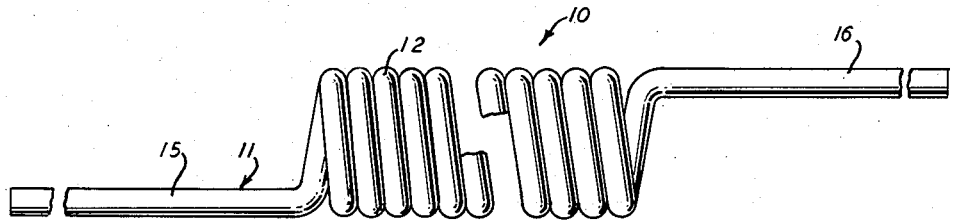
Fig. 1 is a fragmentary view of a retractile cord, the end portions of which are unstripped.

Referring to the drawings, there is shown in Fig. 1, a retractile cord 10 comprising a length of cordage 11 having a central portion 12 wound in the form of a closed helix and heat-treated so that the individual convolutions are maintained normally in close relation to one another. The retractile cord 10 is provided at both ends thereof with longitudinally extending, uncoiled portions 15 and 16 designed to serve as connecting tails for the cord. The cordage 11, from which the retractile cord 10 is formed, includes a plurality of individually insulated conductors 17—17 (Fig. 6) encased in a sheath 19 made principally of rubber or rubber-like compounds, or other types of vulcanizable elastomeric compounds, which may be cured by the application of heat and pressure into a tough, elastic material.

Figure 2:
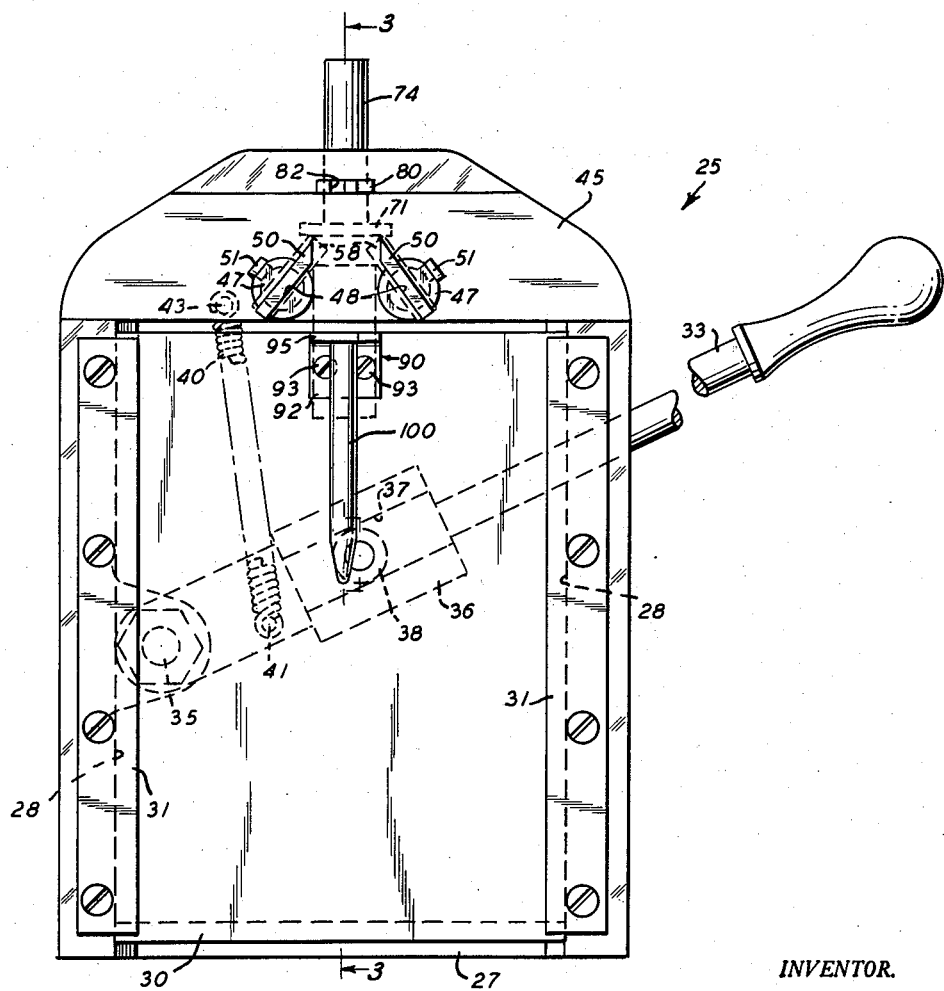
Fig. 2 is a top plan view of apparatus for stripping the end portions of a retractile cord such as shown in Fig. 1.

To prepare the retractile cord 10 for subsequent conductor tipping operations, in which a plurality of electrically conductive, connector tips (not shown) are attached to the extremities of the individual conductors 17—17, it is desirable to strip the sheath 19 from each of the longitudinally extending, uncoiled portions 15 and 16 of the retractile cord so as to expose the end portions of the conductors. Referring now to Fig. 2, there is shown stripping apparatus 25 designed to strip the sheath 19 from the end portion 15 of the retractile cord 10 without impairing the shape or retractability of the finished product.

The stripping apparatus 25 includes a base 27 having a longitudinally extending, horizontal slideway 28 formed therein. Slidably mounted in the slideway 28 is a generally rectangular slide plate 30. The slide plate 30 is retained in the slideway 28 by longitudinally extending track members 31—31 mounted at either side of the slideway for cooperation with the lateral edges thereof. The slide plate 30 may be moved longitudinally back and forth along the slideway 28 by the manipulation of a hand lever 33 mounted pivotally at its inner end to the base 27 by a pin 35.

As shown in Fig. 2, the hand lever 33 is provided with an enlargement 36 having a slot 37 formed in its upper surface. A stud 38 fixed to and depending from the underside of the slide plate 30 projects into and is slidably received within the slot 37. A tension spring 40 is attached at one end thereof to an anchor pin 41 fixed to the hand lever 33 and at its other end to an anchor pin 43 secured to the base 27. It may be seen that by movement of the hand lever 33 the slide plate 30 may be moved longitudinally back and forth in the slideway 28. The tension spring 40 normally urges the hand lever 33 to its extreme forward position, as viewed in Fig. 2.

Figure 3:
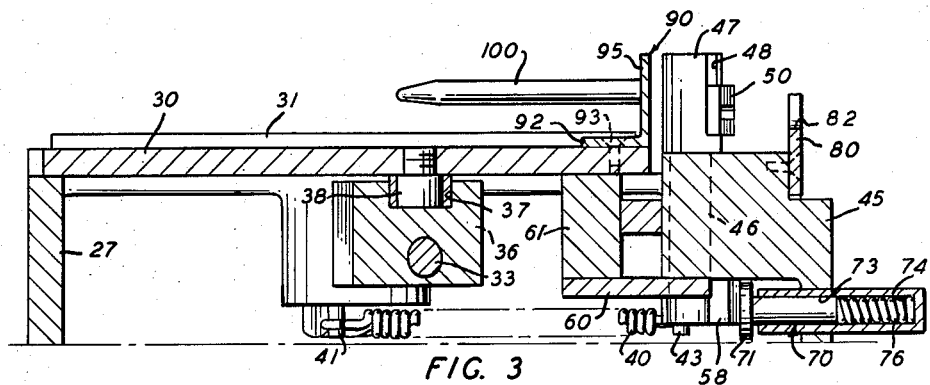
Fig. 3 is a vertical section taken along line 3—3 of Fig. 2.

Formed integrally with the base 27 at the forward end thereof is a forward portion 45 in which is journalled two vertically extending shafts 46—46 (Figs. 3 and 5). The shafts 46—46 are provided with enlargements 47—47 adjacent to their upper ends which are provided with transverse slots 48—48. Stripper blades 50—50 are positioned removably and adjustably in the slots 48—48 and are held in place by set screws 51—51. As shown in detail in Fig. 5, the stripper blades 50—50 preferably have beveled edges 52—52 and are provided with opposed, generally semicircular cutout portions 53—53.

At their lower ends the shafts 46—46 are slotted to receive operating members 58—58 which are held in place by the set screws 57—57. The operating members 58—58 are designed to be struck and moved by a striker 60 which is carried on a support 61 secured to and depending from the underside of the forward end of the slide plate 30. When the slide plate 30 is in its forward position, as illustrated in Figs. 2 and 3, the striker 60 has struck the operating members 58—58 and has rotated the shafts 46—46, thereby moving the operating members away from each other and correspondingly moving the stripper blades 50—50 away from each other. In this forward position of the slide plate 30 the stripping apparatus 25 is ready to receive the unstripped end portion 15 of a retractile cord 10.

The stripper blades 50—50 are urged normally into cooperation with each other and the sheath 19 on the end portion 15 of a retractile cord positioned therebetween by a resiliently mounted plunger 70 having an enlarged head 71 arranged to contact the operating members 58—58 as shown particularly in Figs. 3 and 5. The plunger 70 is mounted in a bore 73 in a socket 74 fixed to the base 27 and is urged outwardly by a compression spring 76.

A guide member 80 is positioned immediately in front of the stripper blades 50—50 and centered on the longitudinal axis equidistantly from the shafts 46—46. The guide member 80 is provided with a V-shaped notch 82 and functions to center the end portion 15 of a cord 11 between the stripper blades 50—50 preparatory to the stripping operation. The guide member 80 is secured fixedly to the forward portion 45 of the base 27.

Mounted fixedly on the forward end of the slide plate 30 is a generally L-shaped bracket member 90. One arm 92 of the bracket member 90 is positioned horizontally and is fastened securely to the slide plate 30 by means of threaded fasteners 93—93. The other arm 95 of the bracket member 90 projects vertically upwardly from the topside of the slide plate 30 and supports a longitudinally extending, horizontally disposed, tapered horn 100. The horn 100, may be formed from a tapered steel dowel, or the like, which is welded or otherwise fixedly secured at its larger end to the rear surface of the vertical bracket arm 95 adjacent to the upper end thereof. The horn 100 is designed to receive a number of successive convolutions of the helically coiled central portion 12 of the retractile cord 10, these convolutions being the ones adjacent to the end portion 15 which is presently to be stripped of its sheath 19.

The diameter of the horn 100 at its largest cross section is slightly less than the normal internal diameter of unrestrained convolutions of the helically coiled central portion 12 of the cord 10. The taper imparted to the horn 100 facilitates the rapid placement of the convolutions of the helically coiled central portion upon the horn. As shown in Fig. 6, the bracket arm 95 has a width somewhat greater than the maximum diameter of the horn 100, and thus effectively forms a raised lip around the forward end of the horn 100. A U-shaped notch 105 (Fig. 6) formed in the right hand edge of the bracket arm 95 beneath the horn 100 is designed to receive the uncoiled end portion 15 of the cord 10. When the end portion 15 is received within the U-shaped notch 105 in the bracket arm 95 and the V-shaped notch 82 in the guide member, it is aligned accurately between the stripper blades 50—50.

*Operation*

When the stripping apparatus 25 is not in use, the tension spring 40 urges the hand lever 33 to its extreme counterclockwise position, as viewed in Fig. 2, and the slide plate 30 occupies its extreme forward position. In that position the striker 60 carried by the slide plate 30 is in engagement with the operating members 58—58. The operating members 58—58 are held apart from one another against the action of the spring-pressed plunger 70 so as to move the stripper blades 50—50 apart to their maximum point of separation, as illustrated in Figs. 2 and 3. The stripping apparatus 25 in this position is ready to receive a retractile cord 10 for stripping the sheath 19 from the end portion 15 thereof.

Figure 4:
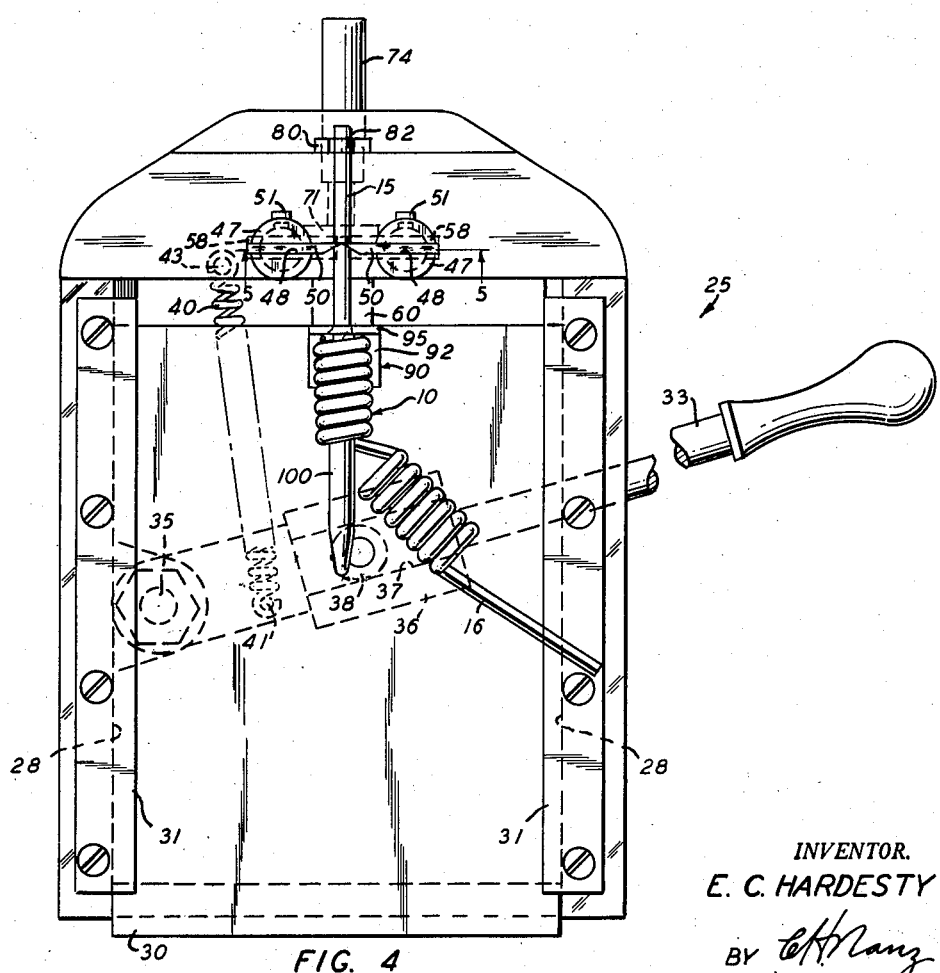
Fig. 4 is a top plan view of the apparatus shown in Fig. 2 illustrating the parts in an operative position.

Preparatory to a stripping operation to be performed on the end portion 15 of the retractile cord 10, a plurality of the convolutions of the helically coiled central portion 12 adjacent to the end portion are slipped over the tapered horn 100, as shown in Figs. 4 and 6. The longitudinally extending end portion 15, which is to be stripped, is positioned in the notches 82 and 105 in the guide member 80 and bracket arm 95, respectively, so that it is aligned accurately between the separated stripper blades 50—50.

The hand lever 33 is now moved in a clockwise direction, as viewed in Fig. 2. As this occurs, the slide plate 30 is moved rearwardly and the striker 60 releases the operating members 58—58 to allow the spring-pressed plunger 70 to rotate the shafts 46—46 so as to move the stripper blades 50—50 into engagement with the sheath 19 on the end portion 15 of the cord 10. The stripper blades 50—50 move into cutting engagement with the sheath 19 on the end portion 15 so as to sever the section of the sheath 19 which lies between the stripper blades and the adjacent extremity of the cord, as shown in Fig. 4.

The beveled edges 52—52 of the stripper blades 50—50, which cut into the sheath 19, hold the sheath against withdrawal as the slide plate 30 continues to move rearwardly. As a result, tension is placed on the end portion 15, which causes the convolutions of the helically coiled central portion 12 of the retractile cord 10 to tighten about and grip the horn 100, as illustrated in Figs. 4 and 6, thereby preventing further longitudinal movement of the end portion relative to the slide plate 30. Thus, continued movement of the slide plate 30 withdraws the end portion 15 from between the stripper blades 50—50 with the result that the beveled edges 52—52 of the blades effectively strip the severed section of the sheath 19 from the end portion 15, as shown in Fig. 6.

The above-described apparatus completely obviates the use of conventional clamping jaws for gripping the retractile cord during stripping operations. The snubbing action of the convolutions of the central portion 12 of the retractile cord 10 on the horn 100, while sufficient to prevent slippage of the end portion 15 relative to the slide plate 30, has no deleterious effect upon the shape or retractability of the cord. Further, the ease with which the retractile cord may be positioned and removed from the stripping apparatus 25 makes it ideally suited to mass production operations.

Manifestly, the invention is not limited to wire stripping operations involving retractile cords of the type described hereinabove. It is obvious that various modifications of the above-described apparatus may be made within the spirit and scope of the invention.

What is claimed is:

1. Apparatus for stripping insulation from insulated wires having spirally coiled portions therein, which comprises stripping means for engaging the insulation on such wire, an elongated member positioned adjacent to said stripping means for receiving one or more of the convolutions of the spirally coiled portion of the wire, a portion of the wire extending from said elongated member into engagement with said stripping means, and means for causing a relative movement apart of said stripping means and said elongated member whereby the convolutions of the wire positioned on said elongated member tighten about the grip said elongated member and the wire is withdrawn from said stripping means to strip the insulation therefrom.

2. Apparatus for stripping insulation from the uncoiled ends of a rectractile cord having a spirally coiled central portion, which comprises a pair of cooperating stripping blades for bitingly engaging the insulation on an uncoiled end portion of such a cord, a member positioned adjacent to said stripping blades comprising an elongated portion with a bracket at one end thereof, said elongated portion facing away from said stripping blades and for receiving one or more of the convolutions of the spirally coiled portion thereon, said bracket positioning said elongated portion with respect to said stripping blades so that the uncoiled end of the cord on said elongated portion is aligned substantially with said stripping blades and extends therebetween, and means for causing a relative movement apart of said elongated member and said blades whereby the convolutions of the wire positioned on said elongated member tighten about and grip said member and the wire is drawn between said blades to strip the insulation from the wire.

3. Apparatus for stripping insulation from insulated wires having spirally coiled portions therein, which comprises stripping means for engaging the insulation on such wire, supporting means positioned adjacent to said stripping means and movable away from said stripping means, an elongated horn mounted fixedly on said supporting means and projecting therefrom in a direction away from said stripping means, said horn being designed for receiving one or more of the convolutions of the spirally coiled portion of the wire, a portion of the wire extending from said horn into engagement with said stripping means, and means for moving said supporting means away from said stripping means, whereby the convolutions of the wire positioned on said horn tighten about and grip said horn and the wire is withdrawn from said stripping means to strip the insulation therefrom.

4. In apparatus for stripping a sheath from an end portion of a rectractile cord having a helically coiled central portion and uncoiled end portions, said apparatus including a support, a slide mounted on the support for longitudinall sliding movement therealong, a pair of pivoted cooperating stripper blades mounted at either side of the longitudinal axis of the slide, resilient means for normally urging the stripper blades into cutting engagement with the sheath on the end portion of a retractile cord positioned therebetween and means operated by the slide for holding the stripper blades separated whenever the slide is in an inoperative position most contiguous to the stripper blades for the reception of the end portion to be stripped therebetween, the improvement which comprises a vertical bracket arm mounted at its lower end to the slide for movement therewith, a horizontally extending, elongated horn attached fixedly to and supported by the bracket arm substantially in parallel alignment with the longitudinal axis of the slide, said horn being spaced above the upper surface of the slide and projecting away from the stripper blades for receiving one or more of the convolutions of the helically coiled central portion adjacent to said uncoiled end to be stripped, said bracket arm having a transversely extending cutout portion formed in one of its vertical edges and designed to receivably engage said uncoiled end portion to be stripped, the latter when properly engaged in said cutout portion extending longitudinally therefrom and between the stripper blades, and means for moving the slide longitudinally away from the stripper blades whereby the stripper blades are urged into cutting engagement with the sheath on said end portion positioned therebetween and the convolutions positioned on the horn tighten about and grip said horn so that said end portion is withdrawn between the stripper blades to strip the sheath therefrom.

References Cited in the file of this patent

UNITED STATES PATENTS 2,563,911   Beck ------------------ Aug. 14, 1951